United States Patent [19]

Kienzle

[11] 4,048,189
[45] Sept. 13, 1977

[54] LIPOPHILIC PHTHALOCYANINES

[75] Inventor: Jean Andre Paul Kienzle, Creil, France

[73] Assignee: Pechiney Ugine Kuhlmann, Paris, France

[21] Appl. No.: 324,715

[22] Filed: Jan. 18, 1973

[30] Foreign Application Priority Data

Jan. 20, 1972 France ............... 72.01855

[51] Int. Cl.² .................................. C09B 47/04
[52] U.S. Cl. ........................... 260/314.5; 8/1 XA; 8/6
[58] Field of Search ..................... 260/314.5

[56] References Cited

U.S. PATENT DOCUMENTS

| 2,863,875 | 12/1958 | Bienert et al. ............... | 260/314.5 |
| 3,057,873 | 10/1962 | Pugin et al. ............... | 260/314.5 |

FOREIGN PATENT DOCUMENTS

| 1,192,858 | 4/1959 | France ............... | 260/314.5 |
| 2,020,812 | 11/1971 | Germany ............... | 260/314.5 |

*Primary Examiner*—John D. Randolph
*Attorney, Agent, or Firm*—Beveridge, DeGrandi, Kline & Lunsford

[57] ABSTRACT

Compound of the formula:

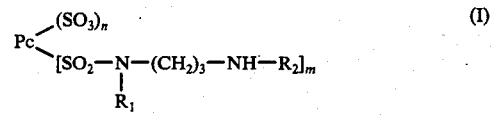

(I)

in which Pc represents a metallized or non-metallized phthalocyanine residue, X represents a hydrogen or alkali metal atom, one of the substituents $R_1$ and $R_2$ represents a linear alkyl or alkenyl residue containing 12 to 18 carbon atoms, and the other represents a hydrogen atom, $n$ represents a whole number or a fraction from 0 to 2 inclusive, $m$ represents a whole number or a fraction from 2 to 4 inclusive, and the sum $m + n$ is equal to or greater than 3; mixtures thereof and derivatives resulting from the action of an $SO_3X$ group on an amino group of a compound of formula (I) or on a compound of the formula:

$R_1$—HN—$CH_2$—$CH_2$—$CH_2$—$R_2$ in which X, $R_1$ and $R_2$ have the meanings given above.

These compounds are useful for the coloration of fats or waxes and may be prepared by reacting one mole of sulphochloride of the formula:

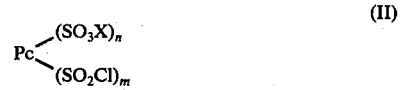

(II)

with at least m moles of a propylenediamine of the formula: $R_1$ — HN — $CH_2$ —$CH_2$ —$CH_2$ —NH — $R_2$ (III) in which Pc, X, $n$, $m$, the sum $n + m$, $R_1$ and $R_2$ have the meanings given above.

6 Claims, No Drawings

LIPOPHILIC PHTHALOCYANINES

The present invention concerns improvements in and relating to lipophilic phthalocyanines.

Sulphonamides, derived from phthalocyanines, which are soluble in fats and organic solvents have already been prepared (German Pat. No. 696,591). Their solubility in fatty acids, however, does not exceed one per cent.

According to the present invention liposoluble phthalocyanines having an improved solubility are provided comprising compounds or mixtures of compounds of the general formula:

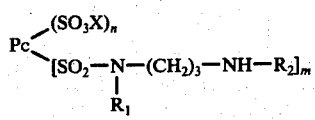
(I)

in which Pc represents a phthalocyanine residue, X represents a hydrogen or alkali metal atom, one of the substituents $R_1$ and $R_2$ represents a linear alkyl or alkenyl residue containing 12 to 18 carbon atoms, and the other represents a hydrogen atom, n represents a whole number or a fraction from 0 to 2 inclusive, m represents a whole number or fraction from 2 to 4 inclusive, and the sum $m + n$ is equal to or greater than 3.

The phthalocyanine may or may not be metallised.

The invention includes a process for the preparation of the new dyestuffs by reacting the sulphochlorides or mixtures of sulphochlorides of the general formula:

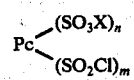
(II)

in which Pc, X, n, m and $n + m$ have the same significance as above, with at least m moles of a propylenediamine of the general formula: $R_1 - HN - CH_2 - CH_2 - CH_2 - NH - R_2$ (III) in which $R_1$ and $R_2$ have the same significance as above, per mole of sulphochloride.

The condensation of a sulphochloride of formula (II) with a diamine of formula (III) leads principally to the formation of a compound of formula (I). However, secondary reactions may take place, for example the reaction of an $SO_3X$ group on the nitrogen atom of the sulphonamido group of a compound of formula (I) or reaction of an $SO_3X$ group on a compound of formula (III).

The invention therefore includes the derivatives of the compounds of formula (I) resulting from the action of an $SO_3X$ group on a secondary amino group of the sulphonamido radical or on a primary or secondary amino group of a compound of formula (III).

Examples of N-alkyl 1,3-propylenediamines which may be used are N-hexadecyl, N-octadecyl, N-dodecyl, N-tetradecyl, and N-octadecene-8yl 1,3-propylenediamines. The reaction is preferably effected in the presence of an alkaline agent such as sodium hydroxide, sodium carbonate or sodium bicarbonate and it may be carried out for example at a temperature between 50° C and 100° C., either in an excess of diamine or in water. The phalocyanine sulphochlorides used for the preparation of the dyestuffs of this invention may be obtained, for example, by reacting phthalocyanine sulphonic acids with halogenating agents such as phosphorus halides, thionyl chloride or chlorosulphonic acid. The methods of sulphochlorination of the phthalocyanines are known and usually give mixtures of sulphochlorides comprising, for example, bis-, tris- and tetrakis-sulphochlorides.

The dyestuffs of formula (I) have a solubility of the order of 10% in fatty acids, and they are suitable for the colouration of aromatic solvents such as benzene or toluene. They may also be used for colouring fats and waxes.

In the following Examples, which are purely illustrative the parts given are parts by weight.

EXAMPLE 1

19.2 parts of the β form of copper phthalocyanine are heated in 120 parts of chlorosulphonic acid at 138°–140° C. for 4 hours. The product is then cooled to 80° C., 15 parts of thionyl chloride are added and the mixture is heated for 3 hours at this temperature, and is then cooled and poured on to ice. The reaction product is filtered off, washed with ice water until the wahings are neutral, drained and made into a paste in 250 parts of methyl alcohol. 46 parts of a mixture of diamines comprising 13.8 parts of N-hexadecyl-1,3-propylenediamine, 13.8 parts of N-octadecyl-1,3-propylenediamine and 18.4 parts of N-octadecene-8,yl-1,3-propylenediamine and 20 parts of sodium carbonate are added to this suspension. The suspension is stirred for a further 20 hours at the ambient temperature, then heated for 2 hours at 55°–60° C. The product obtained is filtered whilst hot, washed with methyl alcohol to remove excess of diamine, and then washed with water.

After drying in vacuo at 60°–70° C., 56 parts of a blue powder are obtained which is insoluble or very sparingly soluble in alcohols containing 1 to 5 carbon atoms and in acetone, but is soluble in toluene and oleic acid, in which it dissolved to the extent of 10%.

If the mixture of N-hexadecyl-, N-octadecyl- and N-octadecene-8yl-1,3-propylenediamines is replaced by a mixture of the corresponding amounts of N-hexadecyl-, N-octadecyl- and N-octadecene-8yl-amines, a product is obtained the solubility of which in oleic acid is less than 1%.

EXAMPLE 2

19 parts of β-copper phthalocyanine are heated for 4 hours in 120 parts of chlorosulphonic acid at 138°–140° C., and the reaction product is then cooled and poured on ice. The product is filtered off, washed with ice water until the washings are neutral, drained and suspended in 250 parts of methyl alcohol. This is neutralised by the addition of sodium carbonate and 60 parts of the mixture of propylene-diamines of the composition indicated in Example 1 are added. Stirring is continued for 20 hours at the ambient temperature (20°–25° C.) The dyestuff is separated by filtration, washed with methyl alcohol to remove excess diamine and dried in vacuo at 60°–70° C. 56 parts of a blue powder are thus obtained the solubility of which is more than 10% in fatty acids and more than 30% in toluene.

EXAMPLE 3

One operates as in Example 1, but the 250 parts of alcoholic solution are replaced by an emulsion of 46 parts of the mixture of diamines used in Example 1 in 250 parts of water. After filtration and washing with alcohol or dilute acetic acid, 57 parts of a powder with the same properties as that obtained in Example 1 are obtained.

EXAMPLE 4

16 parts of anhydrous copper tetrakis (chlorosulphonyl)-phthalocyanine are added to 65 parts of the mixture of diamines used in Example 1. The whole is heated at 95° C. with stirring for 8 hours and is then diluted with methyl alcohol. The reaction product is filtered off and washed with methyl alcohol to remove excess diamine. After drying, 25.5 parts of a blue powder are thus obtained which has properties identical to those of the product obtained in Example 1.

EXAMPLE 5

19.2 parts of β-copper phthalocyanine are headed in 120 parts of chlorosulphonic acid at 120°–125° C. for 5 hours. The mixture is then cooled to 80° C. and 15 parts of thionyl chloride are added and the total mixture is heated for 3 hours at this temperature, cooled and poured on to ice. The product is filtered off, washed with ice water until the washings are neutral, drained and made into a paste in 250 parts of methyl alcohol. To this suspension are added 50 parts of a mixture of diamines comprising 5 parts of N-hexadecyl-1,3-propylenediamine, 2.5 parts of N-octadecyl-1,3-propylenediamine and 42.5 parts of octadecene-8yl-1,3-propylenediamine and 20 parts of sodium carbonate.

The suspension is stirred for a further 20 hours at 20°–25° C. and is then heated for 2 hours at 55°–60° C. The product is filtered hot, washed with methyl alcohol to remove excess of amine and then with water and dried in vacuo at 60°–70° C. 57.5 parts of a blue powder which has a solubility in oleic acid greater than 10% are thus obtained.

EXAMPLE 6

One operates as in Example 2, but the mixture of propylene diamines is replaced by 60 parts of N-octadecyl-1,3-propylenediamine. 58 parts of a blue powder are thus obtained. This powder is soluble in fatty acids to the extent of more than 10% and in toluene to the extent of more than 30%.

EXAMPLE 7

One operates as in Example 5, but the mixture of diamines is replaced by 50 parts of N-octadecene-8-yl-1,3-propylene-diamine. 56 parts of a blue powder are thus obtained, the solubility of which in the fatty acids is higher than 10%.

I claim:

1. Product obtained by reacting, at a temperature between 50° C. and 100° C. and in the presence of an alkaline agent, one mole of phthalocyanine sulfochloride of the formula:

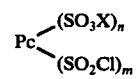

wherein Pc is phthalocyanine or copper phthalocyanine not more than one $SO_2Cl$ or $SO_3X$ group being present on each benzine ring of Pc, X is hydrogen or alkali metal, $n$ is a whole number or a fraction from 0 to 2 inclusive, $m$ is a whole number or a fraction from 2 to 4 inclusive, and the sum $m+n$ is equal to 3 or 4, with at least $m$ moles of a propylenediamine or mixture of propylenediamines of the formula:

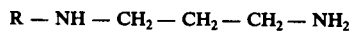

wherein R is linear alkyl or alkenyl containing 12 to 18 carbon atoms.

2. Product according to claim 1 wherein the reaction is effected in an excess of diamine.

3. Product according to claim 1 wherein the reaction is effected in water.

4. Product according to claim 1 wherein the propylenediamine is N-octadecyl-1,3-propylenediamine.

5. Product according to claim 1 wherein a mixture of propylenediamines of formula (III) is used.

6. Product according to claim 1 wherein the mixture of propylene diamines is a mixture of N-hexadecyl-1,3-propylenediamine, N-octadecyl-1,3-propylenediamine and N-octadecene-8yl-1,3-propylenediamine.

* * * * *